(12) United States Patent
Nishioka et al.

(10) Patent No.: US 7,762,295 B2
(45) Date of Patent: Jul. 27, 2010

(54) RUBBER COMPOSITION FOR TIRE AND TIRE USING THE SAME

(75) Inventors: Kazuyuki Nishioka, Kobe (JP); Katsumi Terakawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/526,019

(22) Filed: Sep. 25, 2006

(65) Prior Publication Data

US 2007/0073001 A1      Mar. 29, 2007

(30) Foreign Application Priority Data

Sep. 26, 2005   (JP)  ............... 2005-277906

(51) Int. Cl.
*B60C 11/00*   (2006.01)
*C08L 25/04*   (2006.01)
*C08L 9/06*    (2006.01)
*C08F 36/00*   (2006.01)
*C08F 36/06*   (2006.01)

(52) U.S. Cl. ............... 152/209.1; 525/232; 525/241; 525/332.9; 525/333.2

(58) Field of Classification Search .............. 525/331.9, 525/236, 242, 241, 332.9, 232; 502/209.1
See application file for complete search history.

(56) References Cited

U.S. PATENT DOCUMENTS

| | | | | |
|---|---|---|---|---|
| 4,028,292 A | * | 6/1977 | Korpman | 524/203 |
| 5,446,097 A | * | 8/1995 | Nonaka et al. | 525/193 |
| 5,658,987 A | * | 8/1997 | Nakamura et al. | 525/99 |
| 5,755,899 A | * | 5/1998 | Hecker et al. | 152/510 |
| 6,197,868 B1 | * | 3/2001 | Okamura et al. | 524/492 |
| 6,525,133 B1 | * | 2/2003 | Wideman et al. | 524/848 |
| 2005/0119399 A1 | * | 6/2005 | Nishioka et al. | 524/502 |
| 2006/0084749 A1 | * | 4/2006 | Nishioka | 524/495 |

FOREIGN PATENT DOCUMENTS

| | | | |
|---|---|---|---|
| EP | 1535959 A2 | | 6/2005 |
| EP | 1647572 A1 | | 4/2006 |
| GB | 1120572 A | | 7/1968 |
| JP | 56-103232 A | | 8/1981 |
| JP | 63-101440 A | | 5/1988 |
| JP | 9-143312 A | | 6/1997 |
| JP | 10-195238 A | | 7/1998 |
| JP | 11-49894 | * | 2/1999 |
| JP | 2001-220468 A | | 8/2001 |
| JP | 2001-233994 A | | 8/2001 |
| JP | 2004-263045 A | | 9/2004 |
| JP | 2005-60623 | * | 3/2005 |
| JP | 2005-154696 | * | 6/2005 |
| JP | 2005-154696 A | | 6/2005 |
| JP | 2006-137941 A | | 6/2006 |

OTHER PUBLICATIONS

JP 2005-60623 (Mar. 2005) abstract and translation in English.*
Claudy et al., Polymer Bulletin, 1983, 9, 208-215.*

* cited by examiner

*Primary Examiner*—David Wu
*Assistant Examiner*—Rip A. Lee
(74) *Attorney, Agent, or Firm*—Birch, Stewart, Kolasch & Birch, LLP

(57) ABSTRACT

A rubber composition for a tire and a tire made therefrom which possesses excellent grip performance and abrasion resistance, said rubber composition containing a diene rubber and an aromatic vinyl polymer having a glass transition temperature at most 10° C., the amount of the aromatic vinyl polymer being preferably 5 to 150 parts by weight based on 100 parts by weight of the diene rubber.

4 Claims, No Drawings

RUBBER COMPOSITION FOR TIRE AND TIRE USING THE SAME

BACKGROUND OF THE INVENTION

The present invention relates to a rubber composition for a tire enabling preparation of a tire in which grip performance and abrasion resistance are improved, and a tire using the same.

Recently, consciousness for safety has been enhanced in accordance with high power of automobile movement performance and development of express way. In particular, the grip performance represented by acceleration performance and brake performance is an important requisite property.

The compatibility of high grip performance and abrasion resistance is generally required for a tread rubber of a high performance tire. In order to obtain a rubber composition exhibiting high grip performance, it has been conventionally carried out that, for example, a styrene-butadiene rubber (SBR) having a high glass transition temperature (Tg) is used, equal amounts of a process oil and a resin with a high softening point are substituted and compounded, a softening agent and carbon black are highly filled, a softening agent and carbon black are used in combination, and silica is compounded.

However, a rubber composition using SBR having a high Tg has large temperature dependency, thus, change in performance for temperature change is enlarged, which causes a problem that a tire becomes fragile to be broken. Further, when equal amounts of a process oil and a resin with a high softening point is substituted, if the substitution amount is large, there is a problem that temperature dependency is large due to the influence of the resin with a high softening point. Further, when a large amount of a softening agent such as an oil is compounded, there is a problem that abrasion resistance is lowered. Further, when fine particle carbon black and a large amount of a softening agent are used, there is a problem that dispersibility of carbon black is poor and abrasion resistance is lowered. Further, when silica is compounded, there is a problem that grip performance at a high temperature and abrasion resistance are lowered.

In order to improve these points, JP-A-2005-154696 proposes that a low molecular weight styrene-butadiene copolymer is used. However, since double bonds having crosslinking property exist in the low molecular weight styrene-butadiene copolymer, a portion of a low molecular weight component forms crosslinking with a rubber of matrix, it is incorporated in the matrix, and sufficient hysteresis loss is not generated. Further, when the double bond portions are converted to saturated bonds by hydrogenation so that the low molecular weight component is not incorporated in the matrix by crosslinking, compatibility with the matrix is remarkably deteriorated, and as a result, breakage resistance property tended to be lowered and the low molecular weight component tended to breed.

SUMMARY OF THE INVENTION

An object of the present invention is to provide a rubber composition for a tire excellent in grip performance and abrasion resistance of a tire and a tire using the same.

The present invention relates to a rubber composition for a tire comprising a diene rubber and an aromatic vinyl polymer having a glass transition temperature of at most 10° C., wherein a total amount of styrene-butadiene rubber and butadiene rubber in the rubber component is at least 80% by weight.

It is preferable that an amount of the aromatic vinyl polymer is 5 to 150 parts by weight based on 100 parts by weight of the diene rubber.

It is preferable that the monomer of the aromatic vinyl polymer is styrene.

It is preferable that an amount of a styrene-butadiene rubber is at least 30% by weight in the diene rubber.

Further, the present invention relates to a tire using the rubber composition for the tire.

DETAILED DESCRIPTION

The rubber composition for a tire of the present invention contains a diene rubber and an aromatic vinyl polymer.

The diene rubber is not specifically limited, and examples are a natural rubber (NR), an isoprene rubber (IR), a butadiene rubber (BR), a styrene-butadiene rubber (SBR), an acrylonitrile-butadiene rubber (NBR), a chloroprene rubber (CR), and a butyl rubber (IIR). These rubbers may be used alone and at least 2 kinds thereof may be used in combination. Among these, NR, BR and SBR are preferable since grip performance and abrasion resistance are improved in highly favorable balance, and SBR is more preferable.

An amount of styrene in SBR is preferably at least 20% by weight. When the amount of styrene in SBR is less than 20% by weight, compatibility with an aromatic vinyl polymer is not sufficient, and abrasion resistance tends to be lowered. Further, the amount of styrene in SBR is preferably at most 60% by weight, and more preferably at most 50% by weight. When the amount of styrene in SBR exceeds 60% by weight, not only abrasion resistance is lowered, but also grip performance at a low temperature tends to be deteriorated.

An amount of SBR in the diene rubber is preferably at least 30% by weight, more preferably at least 50% by weight, and particularly preferably at least 80% by weight. When the amount of SBR is less than 30% by weight, there is a tendency that sufficient grip performance and abrasion resistance can not be obtained.

A total amount of SBR and BR is at least 80% by weight, preferably 90% by weight. When the total amount of SBR and BR is less than 80% by weight, sufficient grip performance and abrasion resistance can not be obtained, since sufficient rubber intensity and hysteresis loss can not be obtained. In addition, the total amount of SBR and BR is the most preferably 100% by weight.

The rubber composition for a tire of the present invention can improve grip performance and abrasion resistance in highly favorable balance by comprising an aromatic vinyl polymer having a low glass transition temperature.

Examples of the monomer of the aromatic vinyl polymer are an aromatic vinyl monomer such as styrene, α-methylstyrene, 1-vinylnaphthalene, 3-vinyltoluene, ethylvinylbenzene, divinylbenzene, 4-cyclohexylstyrene and 2,4,6-trimethylstyrene.

The aromatic vinyl polymer used in the present invention refers to a polymer obtained by substantially polymerizing only an aromatic vinyl monomer. As the aromatic vinyl polymer, as long as a monomer is an aromatic vinyl monomer, the aromatic vinyl monomer may be used alone or at least 2 kinds may be used in mixture. It is not preferable to contain a large amount of a monomer other than the aromatic vinyl monomer such as a conjugated diene monomer as the monomer component, since compatibility with the diene rubber is inferior, and further, the monomer is co-crosslinked with the diene rubber at vulcanization, strength is lowered, and abrasion resistance is deteriorated.

As the aromatic vinyl monomer, styrene and 1-vinylnaphthalene are preferable from the viewpoint that they are economical, easily processed, and excellent in grip performance.

A glass transition temperature (Tg) of the aromatic vinyl polymer is preferably at least −50° C., and more preferably at least −45° C. When Tg is less than −50° C., hysteresis loss in the rubber is small and grip performance tends to be lowered. Further, Tg is at most 10° C., and preferably at most 5° C. When Tg exceeds 10° C., abrasion resistance and grip performance at a low temperature are lowered.

An amount of the aromatic vinyl polymer is preferably at least 5 parts by weight based on 100 parts by weight of the diene rubber, and more preferably at least 10 parts by weight. When the amount of the aromatic vinyl polymer is less than 5 parts by weight, an improvement effect of grip performance in particular tends to be hardly obtained. Further, the amount of the aromatic vinyl polymer is preferably at most 150 parts by weight based on 100 parts by weight of the diene rubber, and more preferably at most 100 parts by weight. When the amount of the aromatic vinyl polymer exceeds 150 parts by weight, abrasion resistance tends to be lowered.

It is preferable that the rubber composition for a tire of the present invention further contains a filler for reinforcement. As the filler for reinforcement, it is not particularly limited, as long as it is conventionally used in a rubber composition for a tire such as carbon black, silica, calcium carbonate, magnesium carbonate, clay, alumina, and talc, but mainly, carbon black is preferable and these fillers for reinforcement may be used alone or at least 2 kinds thereof may be used in combination.

A nitrogen adsorbing-specific surface area ($N_2SA$) of carbon black is preferably at least 80 $m^2/g$ and more preferably at least 100 $m^2/g$. When the $N_2SA$ is less than 80 $m^2/g$, grip performance and abrasion resistance tend to be lowered. Further, the $N_2SA$ is preferably at most 280 $m^2/g$ and more preferably at most 200 $m^2/g$. When the $N_2SA$ exceeds 280 $m^2/g$, favorable dispersion is hardly obtained, and abrasion resistance tends to be lowered.

When carbon black is added as the filler for reinforcement, an amount of carbon black is preferably at least 10 parts by weight based on 100 parts by weight of the diene rubber, and more preferably at least 20 parts by weight. When the amount of carbon black is less than 10 parts by weight, abrasion resistance tends to be lowered. Further, the amount of carbon black is preferably at most 200 parts by weight based on 100 parts by weight of the diene rubber, and more preferably at most 150 parts by weight. When the amount of carbon black exceeds 200 parts by weight, processability tends to be lowered.

Further, various chemicals which are generally used in the rubber industry, for example, additives such as a vulcanizing agent such as sulfur, various vulcanization accelerators, various softening agents, various aging inhibitors, stearic acid, an antioxidant, and an ozone deterioration inhibitors can be compounded in the rubber composition for a tire of the present invention, in addition to the diene rubber and the aromatic vinyl polymer.

The tire of the present invention is prepared by a usual process using the rubber composition of the present invention. Namely, the rubber composition of the present invention in which the various chemicals were compounded if necessary is extrusion-processed adjusting with shapes of respective tire parts at the stage of unvulcanization, and is molded on a tire molding machine by a usual process to form an unvulcanized tire. A tire is obtained by heating and pressurizing the unvulcanized tire in a vulcanizer. The tire of the present invention obtained in this process is excellent in the balance of grip performance and abrasion resistance, and the rubber composition is preferably used particularly as a tread of a high performance tire among tire parts.

EXAMPLES

The present invention is explained in detail based on Examples, but the present invention is not limited only thereto.

Then, chemicals used in Examples and Comparative Examples are collectively described.

Styrene-butadiene rubber (SBR): SBR1502 (amount of styrene: 23.5% by weight) available from JSR Co., Ltd.

Natural rubber (NR): RSS#3 available from Tech Bee Hung Co., Ltd. Carbon black: SHOBLACK N220 (nitrogen adsorbing-specific surface area: 125 $m^2/g$) available from CABOT JAPAN K. K.

Aromatic oil: JOMO PROCESS X140 available from Japan Energy Corporation.

Antioxidant: NOCLAC 6C (N-1,3-dimethylbutyl-N'-phenyl-p-phenylenediamine) available from OUCHI SHINKO CHEMICAL INDUSTRIAL CO., LTD.

Stearic acid: available from NOF Corporation.

Zinc oxide: ZINC OXIDE NO. 1 available from Mitsui Mining & Smelting Co., Ltd.

Sulfur: SULFUR POWDER available from Tsurumi Chemical Industry Co., Ltd.

Vulcanization accelerator: NOCCELER NS (N-t-butyl-2-benzothiazolylsulfenamide) available from OUCHI SHINKO CHEMICAL INDUSTRIAL CO., LTD.

<Synthesis of aromatic vinyl polymers (1) to (4)>

(Synthesis of aromatic vinyl polymer (1))

A 50 ml container which was sufficiently replaced with nitrogen was charged with 35 ml of hexane, 5 ml of styrene, and 2.7 ml of a hexane solution of 1.6 mol/l n-butyllithium to be mixed, the mixture was stirred at a room temperature for 1 hour, thereafter, the reaction was terminated by adding methanol to synthesize the aromatic vinyl polymer (1).

(Synthesis of aromatic vinyl polymer (2))

A 50 ml container which was sufficiently replaced with nitrogen was charged with 35 ml of hexane, 5 ml of styrene, and 3.4 ml of a hexane solution of 1.6 mol/l n-butyllithium to be mixed, the mixture was stirred at a room temperature for 1 hour, thereafter, the reaction was terminated by adding methanol to synthesize the aromatic vinyl polymer (2).

(Synthesis of aromatic vinyl polymer (3))

A 50 ml container which was sufficiently replaced with nitrogen was charged with 35 ml of hexane, 5 ml of 1-vinyl naphthalene, and 2.3 ml of a hexane solution of 1.6 mol/l n-butyllithium to be mixed, the mixture was stirred at a room temperature for 1 hour, thereafter, the reaction was terminated by adding methanol to synthesize the aromatic vinyl polymer (3).

(Synthesis of aromatic vinyl polymer (4))

A 50 ml container which was sufficiently replaced with nitrogen was charged with 35 ml of hexane, 5 ml of styrene, and 0.9 ml of a hexane solution of 1.6 mol/l n-butyllithium to be mixed, the mixture was stirred at a room temperature for 1 hour, thereafter, the reaction was terminated by adding methanol to synthesize the aromatic vinyl polymer (4).

The monomer, glass transition temperatures and weight average molecular weights of the obtained aromatic vinyl polymers (1) to (4) are shown in the following. Further, the glass transition temperatures of the aromatic vinyl polymers (1) to (4) were measured at a temperature increasing rate of 10° C./min using an auto differential scanning calorimeter manufactured by Shimadzu Corporation, the weight average molecular weight (Mw) was measured using a GPC 8000 series device manufactured by Tosoh Corporation and using a differential refractometer as a detector, and a molecular weight was measured by calibration with standard polystyrene.

Aromatic vinyl polymer (1) (monomer: styrene, glass transition temperature: −20° C., weight average molecular weight: 830)

Aromatic vinyl polymer (2) (monomer: styrene, glass transition temperature: 0° C., weight average molecular weight: 1020)

Aromatic vinyl polymer (3) (monomer: 1-vinyl naphthalene, glass transition temperature: 0° C., weight average molecular weight: 860)

Aromatic vinyl polymer (4) (monomer: styrene, glass transition temperature: 50° C., weight average molecular weight: 3130)

Examples 1 to 4 and Comparative Examples 1 to 3

Chemicals other than sulfur and a vulcanization accelerator were added in the compounding amounts shown in Table 1, and the mixture was kneaded at 150° C. for 5 minutes using a Banbury mixer. Thereto were added the sulfur and vulcanization accelerator in the compounding amounts shown in Table 1 to the obtained kneaded articles, and the mixture was kneaded at 50° C. for 5 minutes using a twin screw open roll to obtain unvulcanized rubber compositions.

Then, treads were formed by extruding the unvulcanized rubber compositions into a tread shape by a calendar roll in a process usually used, and the treads were pasted with other tire parts to prepare tires having a size of 215/45R17 by vulcanizing for 15 minutes at the condition of 170° C. The following tests were carried out for the obtained tires.

(Grip performance)

The tires were loaded on a vehicle, the vehicle ran 10 rounds on the test course of an asphalt road surface, and a test driver evaluated grip performance. The grip performance of the tire of Comparative Example 1 was referred to as 3 points, and evaluation was carried out, assuming 5 points as the maximum points. Further, the first round was evaluated as the initial grip performance and the second to the tenth rounds were evaluated as the grip performance. It is indicated that the larger the value is, the better the grip performance is, which is excellent. (5: Good, 4: Slightly good, 3: Normal, 2: Slightly poor, 1: Poor)

(Abrasion resistance)

The tires were loaded on a vehicle, the vehicle ran 20 rounds on the test course, the change of groove depth before and after the running was measured, and respective changes were expressed by indices according to the following formula (abrasion resistance index) referring the depth of Comparative Example 1 to as the basis. It is indicated that the larger the abrasion resistance index is, the better the abrasion resistance is.

(Abrasion resistance index)=(Change of groove depth of Comparative Example 1)/(Change of groove depth of each composition)

Test results are shown in Table 1.

TABLE 1

|  | Ex. | | | Com. Ex. | | | |
| --- | --- | --- | --- | --- | --- | --- | --- |
|  | 1 | 2 | 3 | 1 | 2 | 3 | 4 |
| Amounts (part by weight) | | | | | | | |
| Styrene butadiene rubber | 100 | 100 | 100 | 100 | 100 | 20 | 50 |
| Natural rubber | — | — | — | — | — | 80 | 50 |
| Carbon black | 50 | 50 | 50 | 50 | 50 | 50 | 50 |
| Aromatic oil | — | — | — | 15 | — | 15 | — |
| Aromatic vinyl polymer (1) | 15 | — | — | — | — | — | 15 |
| Aromatic vinyl polymer (2) | — | 15 | — | — | — | — | — |
| Aromatic vinyl polymer (3) | — | — | 15 | — | — | — | — |
| Aromatic vinyl polymer (4) | — | — | — | — | 15 | — | — |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization accelerator | 1 | 1 | 1 | 1 | 1 | 1 | 1 |
| Evaluation results | | | | | | | |
| Initial grip performance | 4.5 | 4 | 3.5 | 3 | 2.5 | 4 | 4 |
| Grip performance | 3.5 | 4 | 3.5 | 3 | 3 | 2 | 3 |
| Abrasion resistance index | 110 | 106 | 102 | 100 | 90 | 98 | 104 |

In any of Examples 1 to 4 wherein the aromatic vinyl polymer having a glass transition temperature of at most 10° C. was compounded, grip performance and abrasion resistance were improved.

According to the present invention, a rubber composition for a tire highly balancing grip performance and abrasion resistance, and a tire using the same can be provided by compounding a diene rubber and an aromatic vinyl polymer having a glass transition temperature of at most 10° C.

What is claimed is:

1. A tire tread formed from a vulcanized rubber composition which consists essentially of: (i) a diene rubber component which consists essentially of styrene-butadiene rubber and/or butadiene rubber; (ii) an aromatic vinyl polymer, wherein said aromatic vinyl polymer has a glass transition temperature of at most 10° C., and wherein the aromatic vinyl polymer is polystyrene or poly-1-vinyl naphthalene; (iii) one or more fillers for reinforcement; and (iv) additives.

2. The tire tread of claim 1, wherein an amount of the aromatic vinyl polymer (ii) is 5 to 150 parts by weight based on 100 parts by weight of the diene rubber component (i).

3. The tire tread of claim 1, wherein an amount of a styrene-butadiene rubber is at least 30% by weight in the diene rubber component (i).

4. The tire tread of claim 1, wherein the additives are selected from the group consisting of vulcanizing agents, vulcanization accelerators, softening agents, aging inhibitors, stearic acid, antioxidants, and ozone deterioration inhibitors.

* * * * *